(No Model.)

A. GERDUM.
COUNTER SCALE.

No. 320,776. Patented June 23, 1885.

Witnesses.
J. H. Burridge
N. A. Harvey

Inventor.
Albert Gerdum
W. H. Burridge
Atty

UNITED STATES PATENT OFFICE.

ALBERT GERDUM, OF CLEVELAND, OHIO.

COUNTER-SCALE.

SPECIFICATION forming part of Letters Patent No. 320,776, dated June 23, 1885.

Application filed May 27, 1884. (No model.)

*To all whom it may concern:*

Be it known that I, ALBERT GERDUM, of Cleveland, in the county of Cuyahoga and State of Ohio, have invented new and useful Improvements in Counter-Scales; and I do hereby declare the following to be a full and complete description thereof.

The object obtained by the above said improvement in counter-scales consists, first, in a disuse of the check-bar, an essential element in an ordinary counter-scale so constructed that the article to be weighed is placed above the pivotal bearing or fulcrum of the beam instead of being suspended therefrom; secondly, the improvement alluded to provides for a distribution of the weight of the matter being weighed and the weights used for that purpose upon several sustaining points or fulcrums, thereby rendering the action of the scale more sensitive and accurate in its measurement of weights than when the united weights above mentioned are concentrated upon one pivotal bearing or fulcrum, as in the ordinary counter-scale.

The accompanying drawings illustrate the construction and operation of the improved scale and form a part of this specification.

Figure 1:
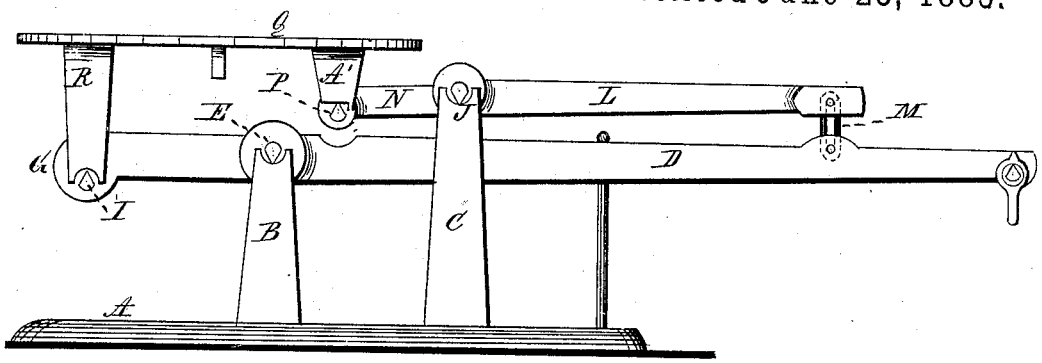
Figure 2:
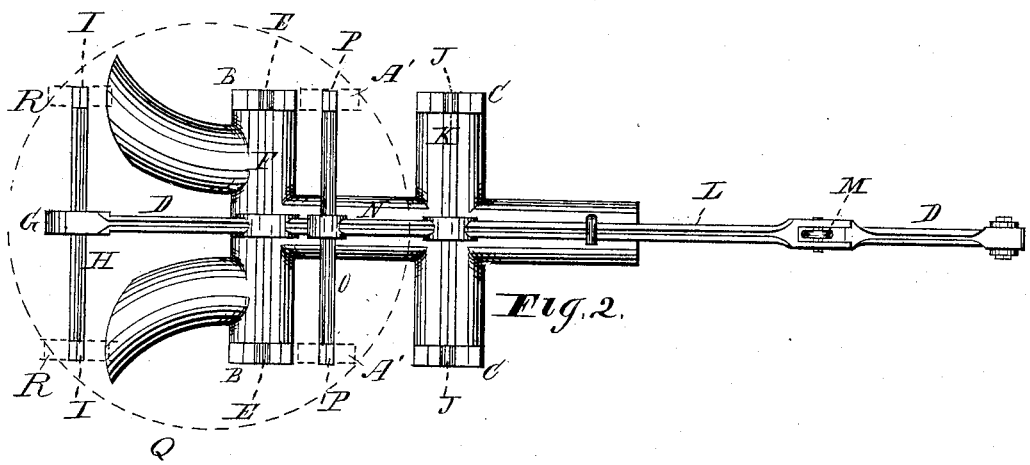
Figure 3:
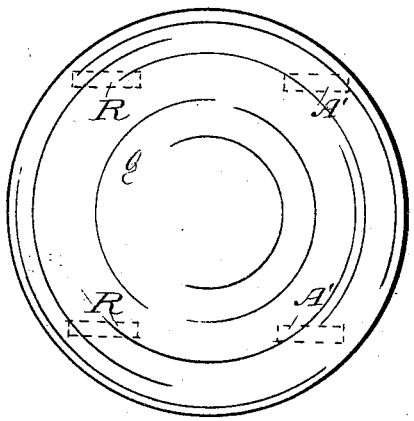

Figure 1 represents a side elevation of the improved scale. Fig. 2 is a plan view of the same, the platform being outlined in dotted lines that the mechanism may be more fully seen. Fig. 3 is a detached view of the platform.

The same letters of reference refer to the same or like parts in the several views.

In a suitable frame, which in the drawings consists of the base A and standards B B and C C, are arranged the following devices: D is a part of the beam of the scale, and consists of a lever of the first order or class. Said beam is disposed between the standards B B and supported thereon by the usual V-shaped bearings or fulcrums, E, terminating, respectively, the ends of the shaft F, Fig. 2. In the short end G of the beam D is a similar shaft, H, the ends of which terminate in the V shape bearings or fulcrums I, to which further attention will hereinafter be called. Between the standards C, and supported thereon by the V-shaped fulcrums J, terminating the shaft K, is a lever, L, of the first-class, arranged in relation to the lever D as shown in the drawings, in which it will be seen that they are placed one above the other, and that the end of the lever L is connected with the lever D by a link, M, at a determinate distance from the end thereof. In the short arm N of the lever L is a shaft, O, the ends of which terminate in V shape bearings or fulcrums P. It will be observed that the bearing-edges of the fulcrums J and the bearing-edges of the fulcrums P are in the same line with the suspension-point of the link M. The platform Q is supported by the short arm of each of the levers by means of the legs R and A', Fig. 1, also indicated in dotted lines, Figs. 2 and 3. The longer legs rest upon the fulcrums I of the beam D and the shorter ones upon the fulcrums P of the beam L, substantially as shown in Fig. 1, in which it will be seen that the platform is in a horizontal position and resting, as aforesaid, upon the fulcrums I and J, while the lever D is supported in the standards B and the lever L in the standards C. In the ordinary counter-scale one beam only is used, corresponding to the lever D, and the weight of the article being weighed and the weights used for that purpose are all concentrated upon the one fulcrum, as at E. So large a weight imposed upon the fulcrums, which are sharp-edged, causes them to cut into the bearings or rests, thereby producing an increment of friction of the fulcrums, and by constant use soon destroys the equilibrium of the beam and the scale ceases to weigh accurately. Also, a single-beam counter-scale requires a check-bar to cause the platform thereof to descend in a vertical direction and at the same time be retained in a horizontal position while going down. For said purposes one end of the check-bar is attached to a rod depending from the bottom of the platform. The opposite end of the bar is pivoted to the under side of the base or floor of the scale. Such a scale requires to be most carefully made to insure accuracy in weighing—that is to say, the distance from the bearing-edge of the fulcrum on which the platform rests to the pivotal point of the connection of the check-bar with the rod depending from the platform must be the same length exactly that the edge of the fulcrum supporting the beam is from the end of the check-bar pivoted to the floor of the scale, and that the length of the check-bar between its two pivotal points must be the same that is between the fulcrum of the platform and the fulcrum of the beam. To make these several connections and of the exact length requires most careful manipulation to insure a perfect scale. These several connections are necessarily points of frictional resistance, and when the scale is in constant use they soon become worn, causing an increment of friction and a consequent retardment in the action of the scale, attended by a variation in the length of the connections above described. Therefore the scale is no longer accurate in weighing; hence a readjustment of the scale is required, and that often, if in constant use. Furthermore, in a single-beam counter-scale the fulcrum supporting the platform is at the center of said platform; hence when the article to be weighed is not placed directly over the bearing-points of the fulcrum, but more or less on either side thereof, there is exerted on the bearings of the fulcrum a corresponding oblique or side pressure, instead of a pressure directly downward, as there would be if the weight were directly above the fulcrum. This side pressure, although it may not be much at any one time, will, by the constant use of the scale, cause a slipping of the edge of the fulcrum from its true central position, attended by a consequent derangement in the balance of the beam, thereby causing it to weigh inaccurately.

The above-mentioned defects, observable in the ordinary counter-scale, are wholly avoided in the scale constructed as shown in the drawings and herein described, in which there is no check-bar of any kind to interfere with a free and immediate action of the scale.

The combination of the levers or beams, as shown, allows the platform to remain perfectly horizontal while moving downward, and the weight that may be thereon and the weights that may be hanging from the beam or beams are distributed upon the fulcrums J and E, instead of being borne upon one, as in the single-beam scale; and the matter being weighed, whether placed directly on the center of the platform or distant therefrom, can produce no change in the direction of the pressure of said weight upon the bearings of the beams, as the weight of the matter being weighed will always be in the line of gravity, without the least side or oblique pressure exerted upon the fulcrums.

I desire it to be understood that I do not confine myself to the fact of resting the platform upon the fulcrums of the beams, for said platform may be supported in a frame and the frame suspended from the fulcrums of the beams without changing the nature of my invention.

What I claim as my invention, and desire to secure by Letters Patent, is—

A weighing-scale comprising, in combination with the platform or scale-pan and the scale-frame, the beam composed of connected levers separately fulcrumed in the said scale-frame at points between their ends, the platform being supported at the end of said levers partly by one and partly by the other lever, substantially as described.

In testimony whereof I affix my signature in presence of two witnesses.

ALBERT GERDUM.

Witnesses:
J. H. BURRIDGE,
W. A. HARVEY.